No. 668,926. Patented Feb. 26, 1901.
D. McGEE.
BARREL HEAD.
(Application filed Nov. 23, 1900.)
(No Model.)
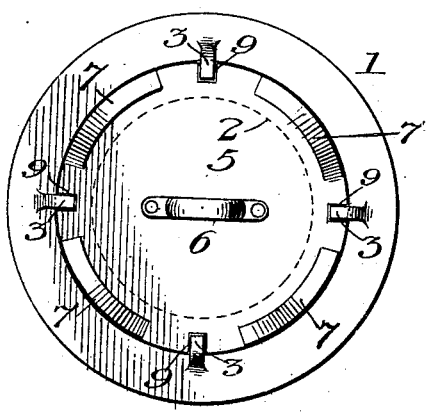
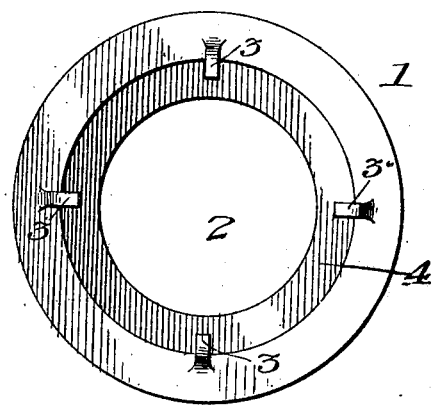
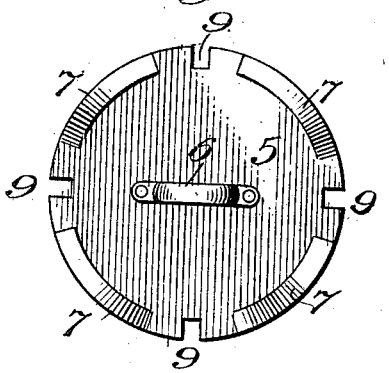
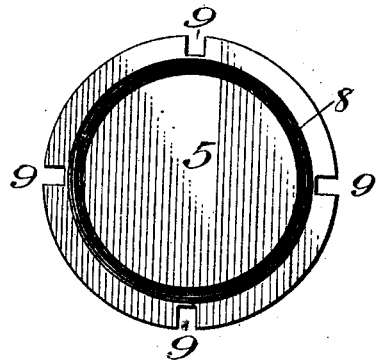
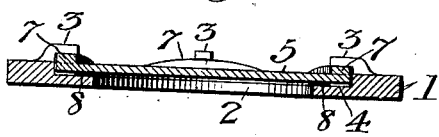
Witnesses:
P. C. Fullerton
O. C. Billman
Inventor:
Daniel McGee
By Obed C. Billman
His Atty.

UNITED STATES PATENT OFFICE.

DANIEL McGEE, OF MEINHARD, GEORGIA.

BARREL-HEAD.

SPECIFICATION forming part of Letters Patent No. 668,926, dated February 26, 1901.

Application filed November 23, 1900. Serial No. 37,415. (No model.)

*To all whom it may concern:*

Be it known that I, DANIEL MCGEE, a citizen of the United States, residing at Meinhard, in the county of Chatham and State of Georgia, have invented a new and useful Improvement in Barrel-Heads, of which the following is a specification.

My invention relates to improvements in barrel-heads; and it has for one of its objects to provide a simple and efficient device of this character which can be readily placed in any barrel in use and one possessing advantages in point of inexpensiveness of manufacture and durability in use.
A further object of the invention is to provide a barrel-head which will afford means of ready access to the contents of the barrel without the use of any tools and which will at the same time serve to strengthen the barrel when the same has been opened. This object I secure by means of the novel construction, arrangement, and combination of parts hereinafter described, and pointed out in the appended claims.
In the drawings forming a part of this specification, Figure 1 is a plan view of the barrel-head constructed in accordance with my invention. Fig. 2 is a similar view with the lid removed. Fig. 3 is a plan view of the lid.
Fig. 4 is an inverted plan view of the lid, showing the beading attached to the lower side thereof. Fig. 5 is a central longitudinal sectional view of the barrel-head, showing the lid in its fastened position.
Similar numerals of reference indicate corresponding parts throughout all the figures of the drawings.

Referring to the drawings, 1 designates the barrel-head proper, provided with an opening 2 and a series of inwardly-projecting lugs 3.

4 designates an annular recess of a depth corresponding with the thickness of the lid or cover, so that when the lid is placed in position it will fit down flush with the adjacent surface of the head.

5 designates the lid, provided with a handle 6 and a series of upwardly-extending convex-faced ribs or flanges 7 and recesses 9, arranged around its periphery, the purposes of which will be hereinafter explained.

The under surface of the lid 5, as shown most clearly in Fig. 4, is provided with an annular beading 8, of rubber or any other suitable and convenient material, and is adapted to fit down and rest within the annular recess 4 of the head adjacent to its inner edge when the lid is placed in position.

In placing the lid on the barrel-head the lid is held in such a position by means of the handle 6 that the openings 9 will register with the projections 3 of the head and the lid is brought to rest within the recess 4 of the head. The lid is then twisted or turned to the right or left, thus causing the convex-faced flanges 7 to take under the projecting lugs 3, and as the inclined faces of the flanges 7 are brought to bear against and move beneath the lugs 3 it is evident that a great inward pressure is exerted to the lid, thus binding the same firmly and snugly to the barrel-head.

I do not wish to be understood as limiting myself to the precise construction above described, as numerous changes in the form, proportion, and the minor details of construction may be resorted to without departing from the principles or sacrificing any of the advantages of this invention.

Having thus described my invention, what I claim, and desire to secure by Letters Patent, is—

1. In a barrel-head, the combination of a head adapted to be secured to the body of a barrel and provided with a centrally-located opening, an annular recess encircling the said opening, said recess being of a depth corresponding to the thickness of the lid and adapted to receive the same, a series of inwardly-projecting lugs arranged around the periphery of the said recess and extending above the same; and a lid fitted in the said recess and provided with a series of recesses arranged around its periphery and having upon its face a series of upwardly-projecting convex-faced flanges arranged intermediate the said recesses and adapted to take under the said inwardly-projecting lugs when the lid is turned to the right or left, and an annular beading secured upon the under side of the lid and adapted to fit within the said annular recess of the head near its inner periphery, substantially as described.

2. In a barrel-head, the combination, with a head provided with a centrally-located opening, an annular recess encircling the said opening, said recess being of a depth corresponding to the thickness of the lid and adapted to receive the same, a plurality of inwardly-projecting lugs arranged around the periphery of the said recess; of a lid fitted in the said annular recess and provided with a plurality of recesses arranged around its periphery and having upon its face a plurality of upwardly-projecting convex-faced flanges arranged intermediate the said recesses and adapted to take under the said inwardly-projecting lugs when the lid is turned to the right or left, and an annular beading secured upon the under side of the lid near its periphery, substantially as described.

3. A lid for barrel-heads, the same consisting of a lid provided with a series of recesses arranged around its periphery and having upon its face a series of upwardly-extending convex-faced flanges arranged intermediate the said recesses, and an annular beading secured upon the under side of the lid near its periphery, substantially as described.

In testimony whereof I have hereunto affixed my signature to this specification in the presence of two subscribing witnesses.

DANIEL McGEE.

Witnesses:
JOSEPH L. SMITH,
VAN R. WINKLER.